June 27, 1961  L. W. CROSBY  2,990,096
FOOD PROCESS AND CONTAINER
Filed April 19, 1957  2 Sheets-Sheet 1
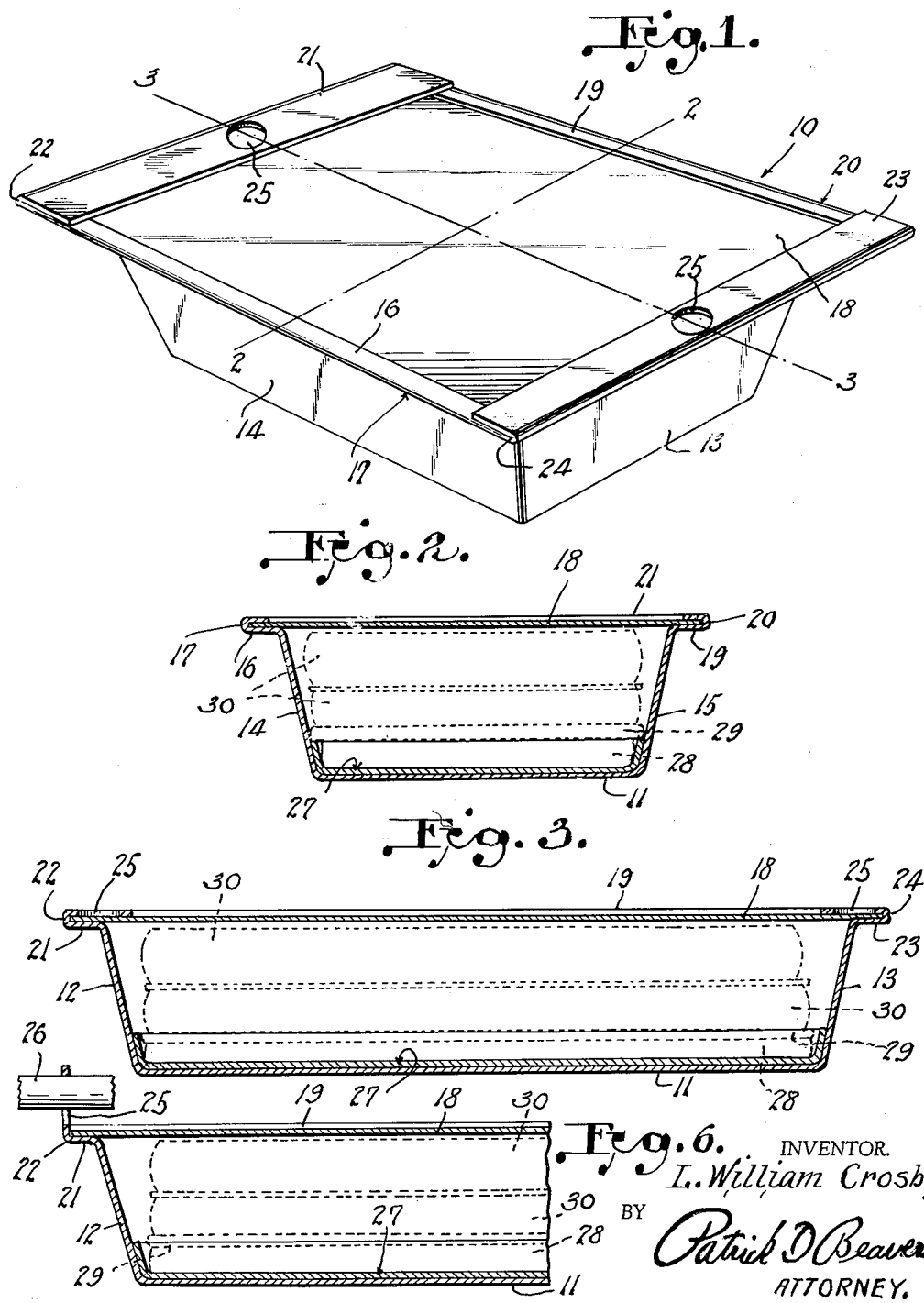
INVENTOR.
L. William Crosby
BY Patrick D. Beavers
ATTORNEY.

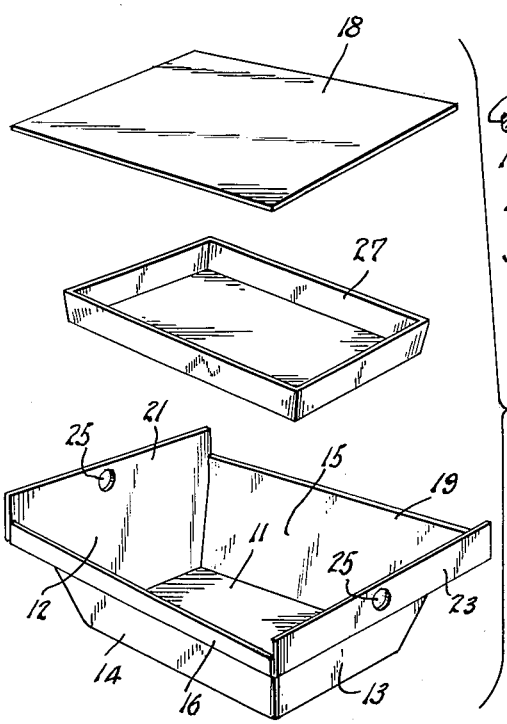
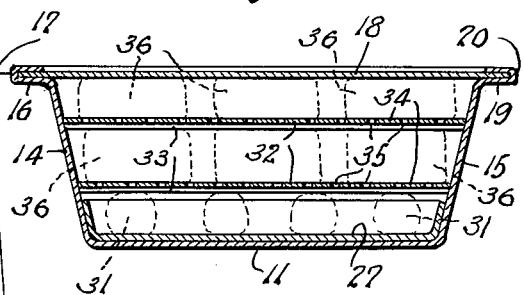
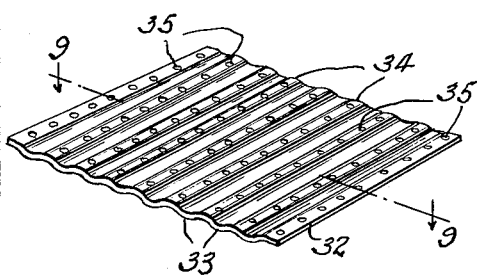
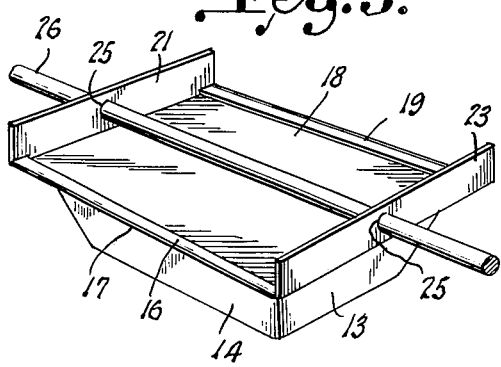
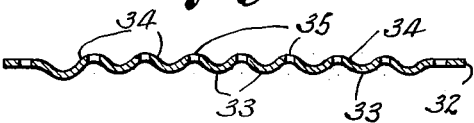

United States Patent Office 2,990,096
Patented June 27, 1961

2,990,096
FOOD PROCESS AND CONTAINER
Leo William Crosby, 1817 Virginia Ave.,
Hagerstown, Md.
Filed Apr. 19, 1957, Ser. No. 653,902
1 Claim. (Cl. 229—15)

This invention relates to improvements in food processing and containers into which various combinations of foods are to be placed in a particular or designated definite pattern so that when the container is heated in various ways, a particular type of eatable food treat is obtained.

An object of the invention is to provide a container into which may be placed precooked foods and/or quick frozen foods so that when heat is applied to the container, the foods will be prepared for eating in a short period of time.

Another object of the invention is to provide a process and container that is made of a pliable metal so that when the container is closed by a lid, the edges of the container may be folded upon the lid so that the lid may be adhesively sealed or crimped to the container.

A further object of the invention is to provide a container that is properly sealed so that when heat is applied to the container, a high fat moisture and pressure reaction will occur, causing the food in the container to readily react to a reheating or cooked condition.

With the above and other objects and advantages in view, the invention consists of the novel details of construction, arrangement and combination of parts more fully hereinafter described, claimed and illustrated in the accompanying drawings, in which:

FIG. 1 is a perspective view of a sealed food container embodying the invention;

FIG. 2 is a transverse sectional view on the line 2—2 of FIG. 1;

FIG. 3 is a longitudinal sectional view on the line 3—3 of FIG. 1;

FIG. 4 is an exploded view of the various parts of the containers;

FIG. 5 is a perspective view of one manner of supporting the container so that it can be suspended over a campfire or other heat producing methods;

FIG. 6 is a detailed fragmentary sectional view of one corner of the container of FIG. 5;

FIG. 7 is a transverse sectional view of the container showing another method of processing food therein;

FIG. 8 is a perspective view of a corrugated perforated insert for the container as used in FIG. 7; and FIG. 9 is a longitudinal sectional view on the line 9—9 of FIG. 8.

Referring more in detail to the drawings, wherein like parts are designated by like reference numerals, the reference numeral 10 is used to generally designate a container embodying or inclosing the food processing of the invention.

The container 10 is made from a pliable metal such as aluminum and comprises a bottom 11 of substantially rectangular formation. The container 10 also comprises outwardly diverging end walls 12 and 13, respectively and outwardly diverging side walls 14 and 15, respectively.

A peripheral flange 16 is provided on the upper longitudinal edge of the side wall 14. The flange 16 extends outwardly at right angles to the plane of the side wall 14 and is bent inwardly upon itself along the line 17 to retain a cover 18 in position on the flange 16.

A peripheral flange 19 is provided on the upper longitudinal edge of the side wall 15. The flange 19 extends outwardly at right angles to the plane of the side wall 15 and is bent inwardly upon itself along the line 20 to retain the cover 18 in position on the flange 19.

A peripheral flange 21 of larger area than the flanges 16 and 19 is provided on the upper longitudinal edge of the end wall 12. The flange 21 extends outwardly at right angles to the plane of the end wall 12 and is bent inwardly upon itself along the line 22 to retain the cover 18 in position on the flange 21. The flange 21 rests upon the outer ends of the flanges 16 and 19, as shown in FIG. 1.

A peripheral flange 23 of similar area to the flange 21 is provided on the upper longitudinal edge of the end wall 13. The flange 23 extends outwardly at right angles to the plane of the end wall 13 and is bent inwardly upon itself along the line 24 to retain the cover 18 in position on the flange 23. The flange 23 rests upon the opposite outer ends of the flanges 16 and 19, as shown in FIG. 1.

Each of the flanges 21 and 23 have an opening 25 provided therein centrally thereof so that a stick 26 may be inserted into the openings 25 when the flanges 21 and 23 have been bent upwardly along the lines 22 and 24 to permit the container 10 to be so suspended over an outdoor fire by the stick 26.

In placing food in the container 10, a loose pan 27 of similar shape and configuration of the container 10, is first placed in the bottom thereof. The pan 27 is made of the same material as the container 10.

In FIGS. 2, 3 and 6, meats 28 are placed in the loose pan 27. Vegetables, poultry or dairy products 29 are positioned on the meats 28. Then a bun or roll 30 is placed on the top of the vegetable, poultry or dairy products 29.

The lid 18 is then placed on the bun or roll 30 and the flanges are bent upon the lid 18, as previously described and the flanges are sealed by adhesive or are crimp sealed.

In FIG. 7 the loose pan 27 is positioned in the bottom of the container 10, rolled or potted meats 31 are placed in the pan 27, an insert or plate 32 of similar material to the container, FIGS. 8 and 9, is then placed on the meats 31. The insert 32 is provided with a plurality of corrugations 33 that extend to one side of the insert 32 and a plurality of corrugations 34 that extend to the opposite side of the insert 32. The corrugations 34 are provided with a plurality of equally and relatively spaced perforations 35.

Waffle fingers 36 or various bakery products are then placed on the insert 32 and a second insert 32 is positioned on the fingers 36. A second layer of waffle fingers 36 is placed on the second insert 32 and then the lid 18 is placed on the second layer of waffle fingers 36. The flanges are then bent upon the lid 18, as previously described, and the flanges are sealed by adhesive or are crimp sealed.

The inserts 32 permit the proper flow or dissipation of heat from the bottom to the top of the container while it is being heated. The inserts 32 may also be used as eating trays if desired.

The foods are usually packed in the container 10 so that the meats of any type or description may be placed in the bottom or top of the container, the vegetable, poultry or dairy products are placed on the meats and then the bakery products are placed on the vegetables.

The meats are usually precooked and quick frozen, the vegetables, poultry, dairy and bakery products are usually quick frozen. To this can be added approximately 15% of animal or vegetable fats. The high fat moisture or pressure reaction in the container causes the foods to readily react to the heat applied to the container.

The heat may be applied by an outdoor fire, gas, flame, electric heat or in an oven.

The combination or processing of foods may be changed or varied as desired. The container 10 is made of a material that allows quick transfer of heat through the container 10 into the inclosed food stuffs.

Weakened lines will be provided in the flanges so that the flanges may be torn and the lid 18 removed so that the contents of the container 10 may be eaten.

Many combinations of meats, vegetables, dairy products, poultry and bakery products may be placed in the containers 10 and directions as to the proper heating procedure will be applied to the lid 18 so that the consumer may properly heat and cook the contents of the container 10 to provide an edible food combination.

It is believed that from the foregoing description the structure and method of processing the food in the container will be apparent to those skilled in the art and it is to be understood that changes in the minor details of construction, arrangement and combination of the various parts of the container, as well as the method of placing of the food in the container may be resorted to provide they fall within the spirit of the invention and the scope of the appended claim.

Having thus described the invention what is claimed as new and desired to be secured by Letters Patent is:

A container for food comprising a rectangular shaped receptacle having inclined side and end walls, said end walls being provided with outwardly projecting flanges, said container being constructed of bendable material, a plurality of trays of gradually increasing area adapted to be disposed into the container to rest against the end and side walls to provide spaced compartments, said side walls being provided with laterally disposed flanges, a cover disposed upon the container and the side flanges, said end flanges being adapted to be bent inwardly upon the top to clamp the same in position against the said side flanges, said end flanges being formed with openings through which a rod can be disposed when said flanges are set in an upright position, to carry the container while hot.

References Cited in the file of this patent

UNITED STATES PATENTS

| | | |
|---|---|---|
| 1,320,002 | Hansen | Oct. 28, 1919 |
| 2,096,825 | Roman | Oct. 26, 1937 |
| 2,662,017 | Winters | Dec. 8, 1953 |
| 2,674,536 | Fisher | Apr. 6, 1954 |
| 2,775,383 | Kollman et al. | Dec. 25, 1956 |
| 2,785,075 | Malecki | Mar. 12, 1957 |
| 2,850,391 | Gunsberg | Sept. 2, 1958 |